US012607267B2

(12) United States Patent
Smith et al.

(10) Patent No.: US 12,607,267 B2
(45) Date of Patent: Apr. 21, 2026

(54) GATE VALVE

(71) Applicant: LB Bentley Limited, Gloucestershire (GB)

(72) Inventors: Edwin Smith, Gloucestershire (GB); Nicholas Johnson, Gloucestershire (GB)

(73) Assignee: LB Bentley Limited (GB)

( * ) Notice: Subject to any disclaimer, the term of this patent is extended or adjusted under 35 U.S.C. 154(b) by 0 days.

(21) Appl. No.: 18/570,469

(22) PCT Filed: Jun. 24, 2022

(86) PCT No.: PCT/GB2022/051634
§ 371 (c)(1),
(2) Date: Dec. 14, 2023

(87) PCT Pub. No.: WO2023/275520
PCT Pub. Date: Jan. 5, 2023

(65) Prior Publication Data
US 2024/0280179 A1 Aug. 22, 2024

(30) Foreign Application Priority Data

Dec. 30, 2021 (GB) ..................................... 2109492

(51) Int. Cl.
*F16K 3/314* (2006.01)
*F16K 3/02* (2006.01)
*F16K 3/18* (2006.01)

(52) U.S. Cl.
CPC ................. *F16K 3/314* (2013.01); *F16K 3/02* (2013.01); *F16K 3/0227* (2013.01); *F16K 3/029* (2013.01); *F16K 3/18* (2013.01); *F16K 3/188* (2013.01)

(58) Field of Classification Search
CPC .......... F16K 3/314; F16K 3/02; F16K 3/0227; F16K 3/029; F16K 3/18; F16K 3/188
(Continued)

(56) References Cited

U.S. PATENT DOCUMENTS 1,828,478 A * 10/1931 Sparks ..................... B21K 1/24
251/328
2,925,993 A * 2/1960 Downs .................. F16K 3/0227
251/328
(Continued)

FOREIGN PATENT DOCUMENTS

CN 104421443 8/2013
CN 204755960 U 5/2015
(Continued)

OTHER PUBLICATIONS

Mr. Joshua Nolan, Patents Act 1977: Search Report under Section 17, GB2109492.5, 2 pages, Intellectual Property Office, Dec. 29, 2021, United Kingdom.
(Continued)

*Primary Examiner* — John Bastianelli
(74) *Attorney, Agent, or Firm* — Anthony J. Bourget

(57) ABSTRACT

A slab gate valve assembly having a housing (12) with an inlet (22), an outlet (24), and a gated fluid passage between the inlet (22) and the outlet (24), at least one valve seat (42, 44) disposed in the housing (12), a gate-carrying shaft (30), and a slab gate plate arrangement (32, 34) in slidable engagement with the at least one valve seat (42, 44) and to be operated via the gate-carrying shaft (30) between an open condition and a shut condition, wherein one or more plates (32, 34) of the gate plate arrangement (32, 34) are mounted at one plate end (33*d*) to the gate-carrying shaft (30), in a manner permitting gate plate articulation relative to the gate-carrying shaft (30), and comprise a free end (33*c*) not mounted to the gate-carrying shaft (30). By permitting plate
(Continued)

articulation in a controlled manner, the assembly avoids a need for a cage, resulting in a reduced number of components and reduced space requirement.

20 Claims, 5 Drawing Sheets

(58) Field of Classification Search
USPC ................................................. 251/326–329
See application file for complete search history.

(56) References Cited

U.S. PATENT DOCUMENTS

| | | | | |
|---|---|---|---|---|
| 3,001,758 | A * | 9/1961 | Ringgenberg | F16K 3/18 |
| | | | | 251/327 |
| 3,025,033 | A * | 3/1962 | Eckert, Jr. | F16K 3/314 |
| | | | | 251/327 |
| 3,172,193 | A * | 3/1965 | Grove | F16K 27/044 |
| | | | | 29/890.128 |
| 3,193,249 | A * | 7/1965 | Bartholet | F16K 39/04 |
| | | | | 251/327 |
| 3,273,855 | A * | 9/1966 | Wells | F16K 3/0227 |
| | | | | 251/327 |
| 4,612,983 | A * | 9/1986 | Karr, Jr. | E21B 33/063 |
| | | | | 251/327 |
| 4,688,597 | A * | 8/1987 | Clarkson | F16K 3/0227 |
| | | | | 251/327 |
| 5,332,002 | A * | 7/1994 | Reimert | F16K 3/029 |
| | | | | 251/328 |
| 9,453,578 | B2 * | 9/2016 | Sundararajan | F16K 3/0236 |
| 2007/0295518 | A1 * | 12/2007 | Deurloo | F16K 15/1821 |
| | | | | 169/17 |
| 2011/0037010 | A1 * | 2/2011 | Parks, Jr. | F16K 3/20 |
| | | | | 251/328 |
| 2011/0220828 | A1 | 9/2011 | Kennedy | |
| 2014/0217320 | A1 * | 8/2014 | DeOcampo | F16K 3/0254 |
| | | | | 137/553 |

FOREIGN PATENT DOCUMENTS

| | | |
|---|---|---|
| CN | 105387224 | 7/2015 |
| CN | 207687381 | 12/2017 |
| CN | 10755439 | 1/2018 |
| CN | 210623625 | 8/2019 |
| GB | 594046 | 10/1947 |
| GB | 791124 | 2/1958 |
| GB | 791124 A * | 2/1958 |
| GB | 1023361 | 3/1966 |
| RU | 2122671 | 9/1994 |

OTHER PUBLICATIONS

Mr. Joshua Nolan, Patents Act 1977: Search Report under Section 17, GB2109490.2, 2 pages, Intellectual Property Office, Dec. 29, 2021, United Kingdom.
Mr. Joshua Nolan, Patents Act 1977: Search Report under Section 17, Dec. 29, 2021, 2 pages, Intellectual Property Office, United Kingdom.
European Patent Office, Patent Translate of RU2122671, Valves Repair Method, 5 pages.
European Patent Office, Patent Translate CN204755960, Gate Vale with Environmental Protection Filtering Function, 10 pages.
European Patent Office, Patent Translate CN207687381, A Low-Pressure Large-Diameter Gate Valve, 7 pages.
European Patent Office, Patent Translate CN104421443, Gate, 13 pages.
European Patent Office, Patent Translate CN105387224, Friction-Free and Easy-to-Open Transfer Valve, 18 pages.
European Patent Office, Patent Translate CN107559439, A Kind of Valve, 16 pages.
European Patent Office, Patent Translate CN210623625, Large-Scale High-Temperature and High-Vacuum Double Gate Valve, 23 pages.
Mr. Joshua Nolan, Patents Act 1977: Examination Report under Section 18(3), Dec. 23, 2025, 4 pages, Intellectual Property Office, United Kingdom.

* cited by examiner

GATE VALVE

FIELD OF THE INVENTION

The present invention relates to a gate valve, more specifically to through conduit gate valve designs that may be carried out as a slab-gate valve design or as a split-gate valve design. More specifically, the present invention relates to a gate slab-carrying arrangement and to a valve seat arrangement, both individually and in combination contributing to a more compact design.

BACKGROUND

A typical gate valve comprises a housing in which the valve gate is positioned in a fluid passage between an inlet port and an outlet port and is disposable between an open position, in which a fluid passage is maintained between the inlet port and outlet port, and a shut position in which the fluid passage is closed. To operate reliably at both lower pressures and higher pressures, which may be in the region of 15,000 psi, the valve gates may be designed to abut against a valve seat located in the housing. Slab gate valves comprise a moveable slab, and may be referred to as split gate valves when comprising two valve gate slabs components. The gate arrangement is located between two valve seats, one upstream and one downstream of the gate arrangement. A contacting face of the valve gate is maintained in sliding contact with the corresponding valve seat throughout the range of movement (from closed to open positions), and the contacting face of the valve gate forms a metal to metal seal with the valve seat in the closed position.

The present invention seeks to provide additional design options to further simplify the assembly, to reduce number of moving parts, and/or reduce the overall weight of an assembly while maintaining performance.

SUMMARY OF THE INVENTION

In accordance with a first aspect of the invention, there is disclosed a slab gate valve assembly as fined by claim 1, comprising a housing comprising an inlet, an outlet, and a gated fluid passage between the inlet and the outlet, at least one valve seat disposed in the housing, a gate-carrying shaft, and a slab gate plate arrangement in slidable engagement with the at least one valve seat and to be operated via the gate-carrying shaft between an open condition and a shut condition, wherein one or more plates of the gate plate arrangement are mounted at one plate end to the gate-carrying shaft, in a manner permitting gate plate articulation relative to the gate-carrying shaft, and comprise a free end not mounted to the gate-carrying shaft.

It will be understood that a gate plate has a generally flat, slab form of elongate proportions to accommodate a fluid passage aperture and a fluid blocking solid portion. The gate plate has edges surrounding the slab form, defining opposite ends of the gate plate. Of two opposite ends, one provides a portion of the gate plate that is mounted in physical connection with the gate-carrying shaft and the other end is a portion of the gate plate that is not mounted directly to the gate carrying shaft, and therefore considered a free end.

The valve seats are located within the fluid passage and comprise an aperture forming part of the fluid passage, oriented laterally of the gate plate arrangement. The gate plate arrangement may comprise a single slab, such as a so-called slab gate valve, or multiple slabs, such as a split gate valve. Each gate plate comprises an aperture for registration with a valve seat aperture in the open condition and a solid plate portion to cover the valve seat aperture in a shut condition.

The connection between the gate plate and the gate-carrying shaft is such that the gate plate is unrestricted from moving with one or more degrees of freedom relative to the gate-carrying shaft. The degrees of freedom may be provided by clearance tolerances between connecting components, enabling the one or more gate plates to move, rotate, twist and/or rock relative to the gate-carrying shaft, whereby the gate plate is permitted to articulate relative to the gate-carrying shaft.

In some embodiments, the gate plate is retained to the gate-carrying stem via a connector component at the one plate end.

It will be appreciated that the retention on the gate-carrying shaft is such that it allows the gate plate to be moved between the open and shut conditions by way of operation of the gate-carrying shaft.

The connector component may be provided by a pin, such as a pin extending through apertures in a portion of the gate-carrying shaft and in a portion of the gate plate to thereby hold the components together.

In some embodiments, a single connector component retains two or more gate plates on the gate-carrying shaft.

In relation to a split gate valve, a connector component such as a pin may extend through both, or each of the, gate plates to retain each plate to the gate-carrying shaft.

In some embodiments, the connector component is a pin oriented across an axis of the gate-carrying shaft.

In some embodiments, the pin may be constrained in position, e.g. by a lateral end stop element. In some embodiments, the pin may not be constrained in position, e.g. the pin may be unrestrained from moving along its axis. The stop element may be configured to restrain movement of the pin relative to the gate-carrying shaft without further restraining the articulated connection of the gate plate. In other words, the pin may be tightened relative to the shaft while leaving some clearance, or slack, of the slab-carrying connection.

The pin may be oriented perpendicularly or obliquely to the axis of the gate-carrying shaft. This reduces the risk of the connector component dislodging during axial movement of the gate-carrying shaft.

In some embodiments, the connector component comprises an anisotropic cross-section.

It will be understood that an anisotropic cross section is a non-circular cross section, such as an oval or oblong cross-section. The anisotropic cross-section may be based on a circular contour comprising additional grooves or protrusions. The anisotropic form reduces and practically eliminates the freedom of the gate slabs to rotate about the axis of the connector component. The anisotropic form may also be designed to reduce, and practically eliminate, slack in the axial movement direction that would otherwise cause a dead movement region when translating an axial movement of the gate-carrying shaft to an axial movement of the gate plate(s).

In some embodiments, the connector component comprises a configuration restricting axial movement of the gate plate relative to the gate-carrying shaft more than rotational movement about the axis of the gate-carrying shaft.

The configuration may be provided by way of an aperture of the gate plate that is greater in width (perpendicularly to the gate-carrying shaft axis) than the width of the connector component, to thereby provide a level of clearance, or leeway, for the gate plate to swivel on the connector component.

In some embodiments, the at least one gate plate comprises an aperture comprising a curved rim contour.

The curvature of the rim contour of the gate plate aperture allows the gate plate to rock relative to a connector component located through the gate plate aperture.

In some embodiments, the connector component comprises a configuration restricting axial movement of the gate plates relative to the axis of the gate-carrying shaft more than movement perpendicular to the axis of the gate-carrying shaft.

The configuration may be provided by a clearance that allows a gate plate to move axially along the connector component, i.e. perpendicularly to the gate-carrying shaft.

In accordance with another aspect of the invention, there is disclosed a slab gate valve assembly, comprising a housing comprising an inlet, an outlet, and a gated fluid passage between the inlet and the outlet, at least one valve seat disposed in a seat pocket of the housing, a gate-carrying shaft, and a slab gate plate arrangement in slidable engagement with the at least one valve seat and to be operated via the gate-carrying shaft between an open condition and a shut condition, wherein at least one valve seat is threadedly disposed in its seat pocket.

In some embodiments, one or more valve seats are threadedly engageable from within the housing.

It will be understood that the housing may contain a valve chamber in which the one or more gate plates are located. The valve chamber provides a void from which, during assembly of the gate valve, a valve seat may be mounted into its respective valve pocket.

In some embodiments, the seat pocket comprises an abutment surface for a seating surface of the valve seat and a seal seat for a peripheral seal of the valve seat, configured such that the peripheral seal contacts the seal seat before the seating surface abuts against the abutment surface.

When brought into abutment with the seat pocket, the peripheral seal may exhibit a degree of deformation, for instance in the form of splaying, which may be an elastic deformation, wherein the extent of deformation is limited by the abutment of the seating surface against the abutment surface.

In some embodiments, the housing comprises a port for the gate-carrying shaft, the valve seats being sized to fit through the port for assembly within the housing.

Thereby, the port for the gate-carrying shaft can be used as an access port during the manufacture and assembly of the valve assembly.

In some embodiments, the valve seat comprises a crown configuration for engagement by a torque-applying tool.

The crown configuration may be provided by an arrangement of peripheral abutment surfaces that are angularly or radially offset relative to each other, surfaces arranged in a polygonal (e.g. hexagonal) manner, crenelations extending parallel to an axis of the valve seat, a slot arrangement, or similar.

In some embodiments, the valve seat comprises a thread region comprising at least 10, 12, 14, 16, or at least 18 threads per inch (tpi, 1 inch=2.54 cm).

Preferably, the valve seat comprises at least 18, 20, 22, 24 or more threads per inch, such as a UNEF thread (unified extra fine thread). Other thread types may be used, such as metric fine pitch threads, or similar fine pitch threads.

In some embodiments, the valve seat comprises a peripheral seal arranged at an oblique angle with reference to an axis of the valve seat.

In some embodiments, the valve seat comprises an integral peripheral seal.

The peripheral seal can be understood as a lip seal, or radial seal extending around an outer mantle surface of the valve seat.

In some embodiments, the peripheral seal is angled in the direction of the seating surface.

An angled configuration may facilitate a splaying behaviour by the peripheral seal or lip seal, while also ensuring a splay-limiting configuration by way of the seating surface.

In some embodiments, the thread is located axially between the seating surface and the peripheral seal.

Features of any one or more of the embodiments described in relation to the other aspect may be combined with features of any one or more of the embodiments described in relation to the first aspect. For instance, a gate valve assembly may comprise an articulated connection of one or more free-ended gate slabs engaging against valve seats that are threadedly disposed in the housing.

The features described herein, individually and combined, allow for a more compact form of a gate valve assembly.

DESCRIPTION OF THE FIGURES

Exemplary embodiments of the invention will now be described with reference to the Figures, in which.

DESCRIPTION

Figure 1:
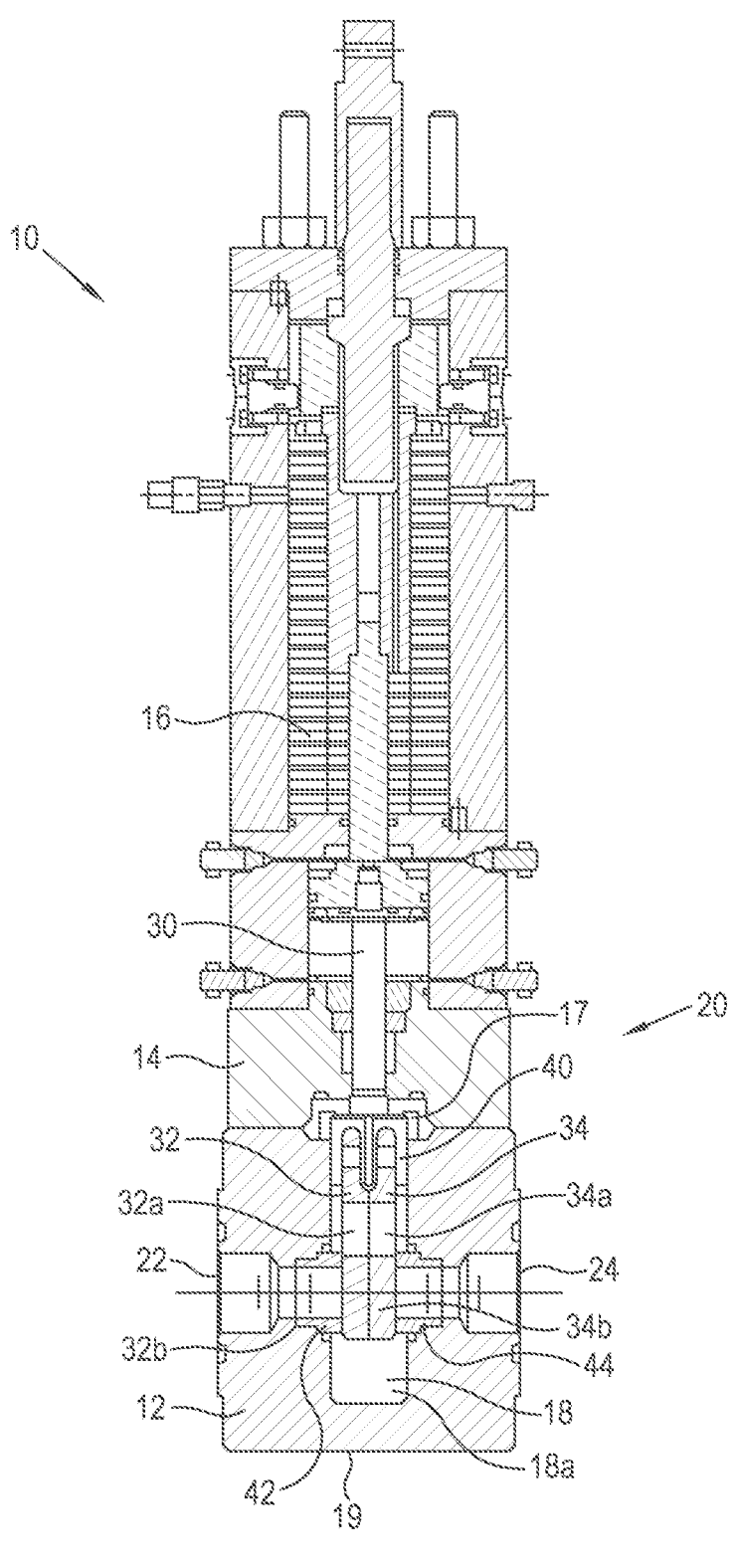
FIG. 1 is a section view of a split gate valve assembly.

Referring to the accompanying figures, a split gate valve 10 and associated components are illustrated. The split gate valve 10 comprises a valve gate body 12 constituting a housing that provides a fluid passage connecting an inlet 22 and an outlet 24. Between the inlet 22 and the outlet 24 there is provided a valve chamber 18 housing a split gate valve assembly 20 operable to open or shut the fluid passage via an actuator 16 acting on a valve stem 30 held slidably in relation to the valve gate body 12 and extending to the exterior actuator side of the valve gate body through a valve bonnet 14. It will be understood that the split gate valve assembly 20 is installed in the valve gate body 12 via a port 17. The valve bonnet 14 is seated on the port 17 of the valve gate body 12 to enclose the valve chamber 18.

It will be appreciated that, while a split gate valve may be designed with a designated upstream end or downstream end, for the purposes of the present disclosure the fluid passage is symmetric, and the outlet and inlet ends may be reversed.

The actuator 16 may be of one of many suitable forms to axially dispose the valve stem 30, e.g. remotely actuatable, and/or biased into a proximal or distal position, and may operate slidably or rotationally to effect an opening or shutting of the valve. The present disclosure uses the example of a gate split gate valve assembly 20 of the valve gate body 12. However, it will be understood that the articulated connection principle may be applied to a (single) slab gate valve.

The split gate valve assembly 20 comprises said valve stem 30 whose outer end protrudes through the bonnet 14 to connect to the actuator 16 and whose inner end carries two gate slabs 32, 34 (a first gate slab 32 and a second gate slab 34). Each of the two gate slabs 32, 34 comprises a fluid aperture 32a, 34a, respectively, and a solid slab body portion 32b, 34b, respectively. The valve stem 30 can be actuated by operation of the valve actuator 16, from outside the valve gate body 12, between an axially proximal position (towards/further inside the valve gate body 12) and an axially distal position (away from/further outside the valve gate body 12). Actuation of the valve stem 30 allows moving the gate slabs 32,34 into a first, open, position in which the fluid apertures 32a,34a are in registration with the fluid passage, therefore providing a passage between the inlet 22 and the outlet 24, or into a second, shut, position in which the fluid apertures 32a,34a are not aligned with the fluid passage, thereby blocking the fluid passage by the solid slab body portions 32b, 34b.

The design of a split gate valve 10 comprises two valve seats 42, 44 of generally annular form, axially oriented in the fluid passage, one each on either side of the gate slabs 32,34. It will be understood that, in use, the fluid aperture 32a of the first gate slab 32 registers with the first valve seat 42 to open and that the solid slab body portion 32b covers the first valve seat 42 to shut the fluid passage, and that simultaneously the fluid aperture 34b of the second gate slab 34 registers with the second valve seat 44 to open and that the solid slab body portion 34b covers the second valve seat 44 to shut the fluid passage. In the case of a single slab gate, a single gate slab is moved by a valve stem between the valve seats to an open or shut position.

FIG. 1 shows the split gate valve assembly 20 in a shut condition, such that the fluid apertures 32a,34a are out of alignment with the fluid passage between the inlet 22 and the outlet 24, and the solid slab body portions 32b,34b are located to block the fluid passage. In the shut condition, a void portion 18a of the valve chamber 18 provides a space which may be occupied by the solid slab body portions 32b,34b of the gate slabs 32,34 when moved into the open position. Opposite the actuator 16, the valve gate body 12 comprises a closed end 19 (in FIG. 1, at the lower end). In some embodiments, the lower end of the valve gate body 12 may comprise an aperture providing access to the valve chamber 18 that may be closed with a separate bonnet component providing a lid to close the valve gate body 12.

The operation of a split gate valve 10 between an open and shut condition by way of axial disposition of a gate slab is similar to the operation of a single slab gate valve. It will be appreciated that the seal mechanism of a split gate valve, as disclosed in the Figures, may differ from a single slab gate valve in that its valve seats (here: valve seats 42,44) are rigidly fixed in position and the gate slabs of the split gate (here: gate slabs 32,34) are mounted with a certain freedom to move in relation to their mount (here: the valve stem), so as to allow the gate slabs 32,34 each to 'float' into a sealing contact abutment with their respective valve seats 42,44. A single slab gate valve may be used in combination with floating or biased (sprung) valve seats to allow the valve seats to come into sealing contact abutment with the gate slab.

Designing a slab gate valve assembly with an articulated connection is not trivial. The slab gate valve assembly needs to be operable such that each gate slab can be actuated via a valve stem. At the same time, each gate slab requires a certain degree of freedom to move relative to the valve stem, seated with sufficient leeway to allow a gate slab to move into sealing abutment with the valve seats. Designs are known for split gate valves in which freedom to move is achieved by housing the gate slabs of the split gate in a cage, or in a frame arrangement, carrying the gate slabs between the open and shut positions in the valve chamber 18 while allowing for a limited degree of leeway of the gate slabs to move in the frame arrangement.

Figure 2:
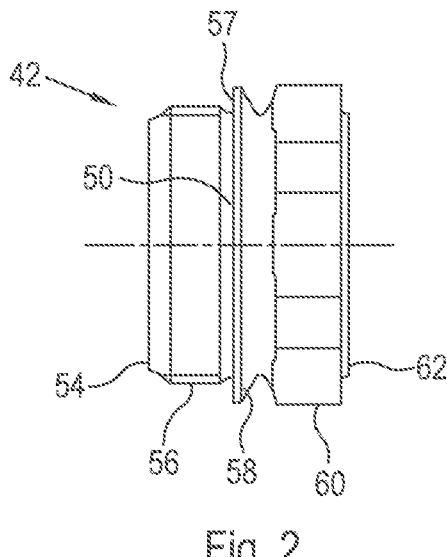
FIG. 2 is a side view of a valve seat.
Figure 3:
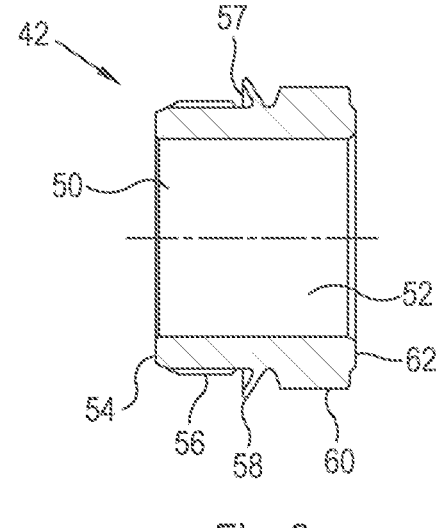
FIG. 3 is a section view of the FIG. 2 valve seat.
Figure 4:
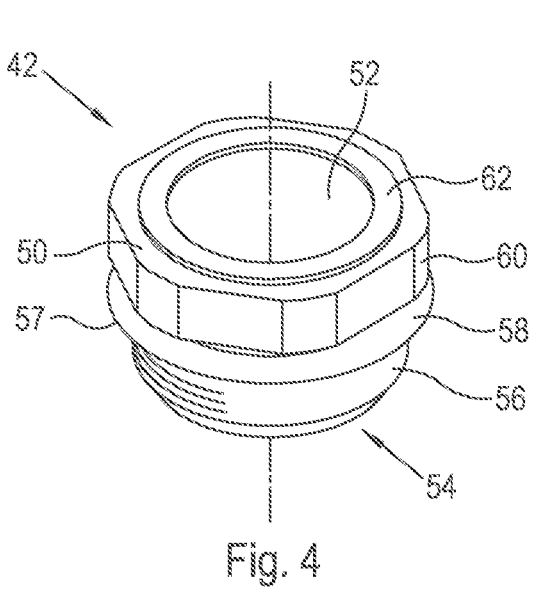
FIG. 4 is an isometric view of the FIG. 2 valve seat.

With reference to FIGS. 2-4, a valve seat 42 is disclosed that may be used in the valve gate body 12 above as the valve seat 42 or 44, respectively. The valve seat 42 comprises a generally annular seat body 50 comprising a central passage 52 extending axially through the seat body 50, a seating surface 54, a thread 56, a peripheral seal 58 providing a lip seal, a crown portion 60, and a gate seat region 62. The central passage 52 is of generally cylindrical shape with circular cross-section. The seating surface 54 is generally flat to allow abutment against a corresponding seating surface of the valve gate body 12. The thread 56 extends along part of the mantle portion of the annular seat body and is shaped corresponding to a thread in the valve gate body 12. Preferably the thread is a so-called UNEF (unified extra fine) thread, such as a 1⅜" thread (18 threads per inch) although other pitch values, such as at least 10, 12, 14, 15, 16, 20, 24, 28 or at least 32 threads per inch, may be used. The peripheral seal 58 is obliquely angled towards the seat abutment surface 54 and provides a generally laminar lip shape surrounding the seat body 50. It will be appreciated that in the axial direction, facing in the direction of the seat abutment surface 52, the radial seal provides a ring edge 57 providing a thin, practically linear ring contact surface for abutment against a corresponding seating surface (see second abutment surface 78 described below) in the valve gate body 12. The peripheral seal 58 is integral with the seat body 50, which is of unitary construction. The crown portion 60 comprises a configuration offering grip to a torque tool and is in the present configuration constituted by a series of outward-facing, radially spaced-apart flats arranged in a polygonal (here: hexagonal) configuration for a corresponding (e.g., hexagonal) torque tool. At its end, the seat body 50 comprises an annular, flat region constituting a gate seat region 62 against which a gate slab 32 or 34 may abut for a tightly sealed arrangement. The gate seat region 62 protrudes axially by a small distance so as to ensure that an axially abutting slab body comes into contact with the gate seat region 62 only.

Figure 5:
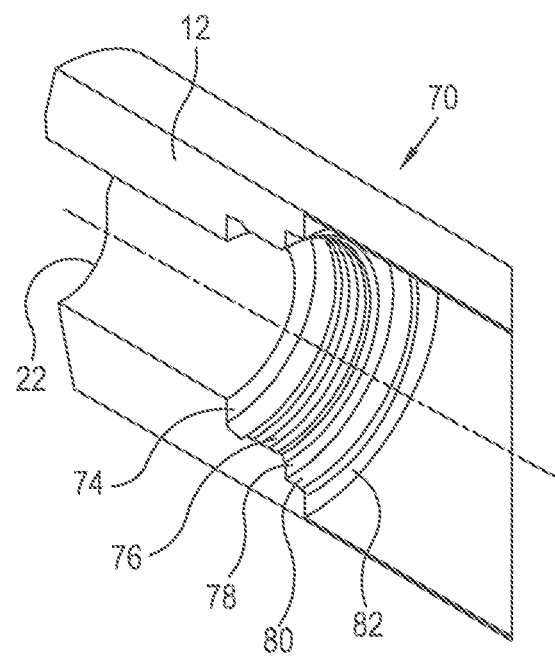
FIG. 5 is an isometric view of a portion of a valve seat pocket.

FIG. 5 shows an isometric cutaway view of a valve-seat receiving portion 70 constituting a seat pocket in the fluid passage of the valve gate body 12. The seat pocket comprises several stepped annular surfaces, a first abutment surface 74 providing an annular, radially extending surface, followed by a threaded body section 76 around an inner mantle surface of the seat pocket, a second abutment surface 78 constituting a seal seat, a peripheral mantle portion 80 and a stepped recess 82. The arrangement is such that the diameter of the threaded body section 76 is smaller than the peripheral mantle portion 80, which is smaller than the stepped recess 82.

Figure 6:
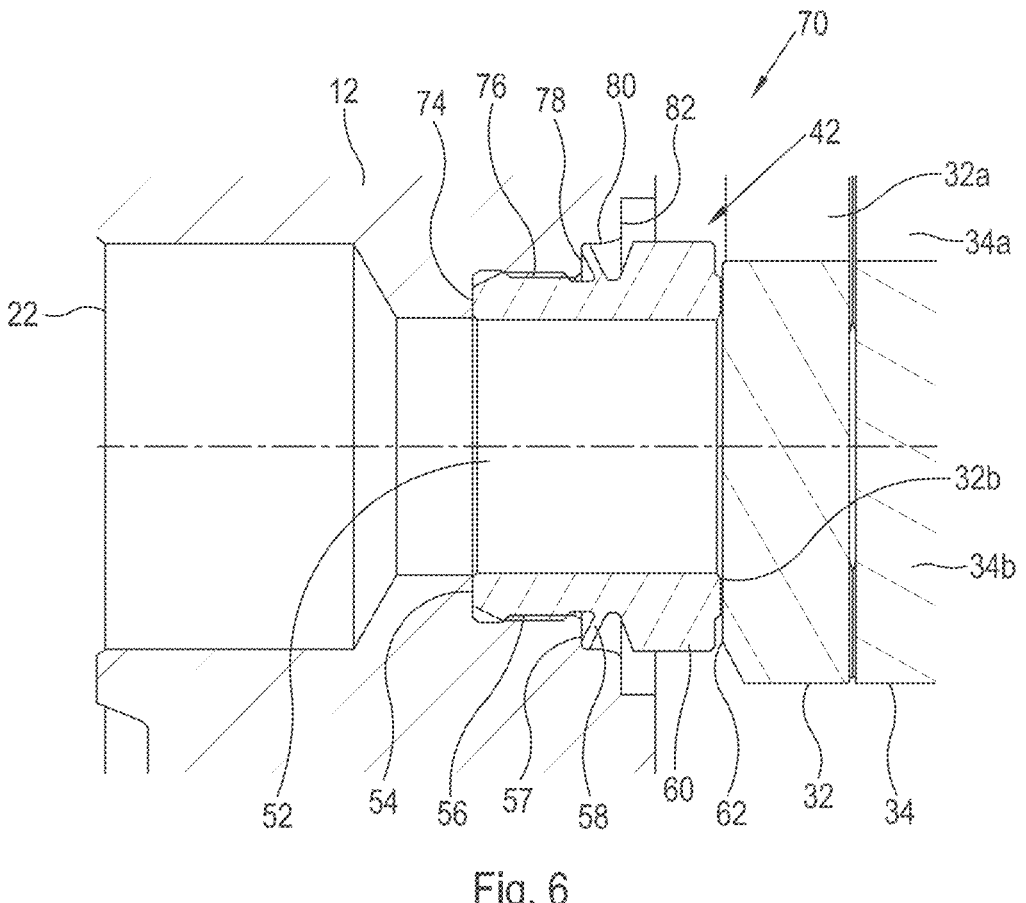
FIG. 6 is a section of a valve seat mounted in a seat pocket.

With reference to FIG. 6, illustrating in section a portion of the valve seat 42 engaged in the seat pocket 70, the first abutment surface 74 provides an annular abutment surface for the seating surface 54. The second abutment surface 78 provides a seal seat for the ring edge 57 of the peripheral seal 58. The threaded body section 76 is configured to correspond to the thread 56, e.g. may be a UNEF thread with 1⅜" pitch (18 threads per inch [tpi]), although other tpi values may be used, as described above with reference to thread 56.

It will be appreciated that the valve seat is threadedly mounted in the seat pocket. The provision of a fine thread (e.g. UNEF 1⅜"-18 threads per inch, or higher) allows the valve seat 42 to be engaged in the valve body 12 with a relatively precise torque load. Preferably, therefore, the threads per inch are at least 10, 12, 14, 16, 18 or more. The axial spacing between the seating surface 54 and the ring edge 57 of the peripheral seal 58 is chosen such that the seating surface 54 comes into abutment with a corresponding surface of the valve gate body 12 after, or no sooner than, the ring edge 57. The arrangement achieves that the ring edge 57 provides a tight, circumferential lip seal, allowing a certain amount of splaying of the lip seal (ring edge 57), wherein the degree of splaying is limited by the abutment of the seating surface 54. Once in abutment, torque applied to the crown portion 60 is transferred into loads acting via the seating surface 54, rather than the ring edge 57. This reduces the risk of overtorquing, or applying too much torque and thereby risking damage to the peripheral seal 58. By providing the lip seal with a wider circumference, it may tolerate relatively more splaying than might otherwise be the case with a smaller circumference.

To the best of the applicant's knowledge, threadedly engaged valve seats are hitherto unknown for gate valves, particularly for split gate valves. One reason for this is believed to be the difficulty in applying an appropriate pre-loading, or torque, to ensure the valve seat is not loosening under the high fluid pressures it is expected to experience in the typical subsea environments in which it is intended to be used. Likewise, applying too much torque creates the practical risk of damaging the peripheral seal, or lip seal, resulting in premature wear and eventually premature failure of the seal.

Known gate valves therefore avoid a threaded valve seat engagement, relying instead on slidable wedge formations. It was an appreciation by the applicant that the challenges associated with a threaded engagement can be mitigated, and can effectively be overcome, by separating the pre-loading surface and the peripheral seal structure of the valve seat/valve pocket interfaces. This is achieved in the present embodiment by a seating surface 54 of the valve seat that comes into abutment with the abutment surface 74 of the seat pocket, avoiding excess load on the lip seal. A further practical improvement is provided in combination with a finely pitched thread (here: a thread of UNEF 18 or higher), which allows the torque preload of the valve seat in the seat pocket to be adjusted over a relative wide range of rotation of the valve seat without risking preload damage such as galling to the peripheral seal 58. Indeed it is believed that peripheral seal 58 can therefore be designed primarily with optimising its sealing behaviour (e.g. geometry and splaying behaviour), e.g. it may be made thinner, avoiding a need for more robust structural design of the lip seal that might otherwise affect the sealing performance. It is also believed that any 'extra' torque—any load that would otherwise exceed a detrimental level for a peripheral lip seal but that is tolerable by way of the abutment of surfaces 54 and 74—assists in better locking the valve seat into position. It is believed that the threaded engagement is sufficiently tight to maintain a sealing engagement of the peripheral seal 58 against the second abutment surface 78, without relying on a seal between the peripheral seal 58 outwardly against the peripheral mantle portion 80, which might otherwise contribute to an increased wear of the lip seal.

Turning to FIGS. 7 to 13, details of the gate-carrying assembly are shown, specifically the connection between the valve stem 30 and the first and second gate slabs 32,34. The valve stem 30 comprises an elongate stem shaft 30a comprising at one end thereof an actuator connection arrangement 31 in the form of a threaded portion, and at the other end thereof a slab holder 40. The actuator connection arrangement 31 connects, when assembled, with the stem shaft 30a extending through the valve bonnet 14 (see FIG. 1) to an actuator 16 outside the valve gate body 12. The slab holder 40 is, when assembled, inside the valve gate body 12 and provides a mounting arrangement for the two gate slabs 32,24 (or one or more gate slabs). The slab holder 40 has a generally cuboid shape comprising, at the distal side (facing away from the actuator connection arrangement 31) two re-entrant recesses 39a, 39b extending axially (axially in the direction of the stem shaft 30a) into the body of the slab holder 40 and extending from side to side (perpendicularly to the stem shaft 30a) through the thickness of the slab holder 40. Body portions of the slab holder 40 comprise a first outer wall 41a, an intermediate wall 41b, and a second outer wall 41c, one re-entrant recess 39a being located between the first outer wall 41a and the intermediate wall 41b, and the other re-entrant recess 39b being located between the intermediate wall 41b and the second outer wall 41c, the internal surfaces of the re-entrant recesses 39a,39b being generally flat and parallel to one another. Perpendicularly to the extension of the re-entrant recesses 39a,39b, the slab holder 40 comprises a pin hole passage 38 extending through the thickness of the slab holder 40, provided by pin holes located in each of one of the first outer wall 41a, the intermediate wall 41b and the second outer wall 41c, each of the pin holes being of essentially the same shape and aligned to provide, in series spaced apart by the re-entrant recesses 39a,39b, a pin hole passage 38. The circumference of the pin hole passage 38 (i.e. of each pin hole making up the passage 38) is generally oval or oblong, and therefore anisotropic.

The pin hole passage 38 is dimensioned to receive a shear pin 36 that constitutes a connector component and is a generally elongate pin with an oval, or oblong cross-section with rounded-edge profile. The cross-section of the shear pin 36 is therefore anisotropic (other than round). As will be described below, an anisotropic cross-section limits the ability of the shear pin 36 to rotate about the axis of the pin hole passage 38. The anisotropic cross-section may be provided by other shapes including grooves or protrusions, however an oval shape is a relatively compact form that may be easier to manufacture than other shapes. In some variants, a plurality of cylindrical shear pins may be provided (e.g. two cylinders with round, isotropic cross section, side by side) to provide a rotation-limiting function of an anisotropic connector element.

The gate slabs 32,34 are essentially identical in shape and so only the gate slab 32 will be described in this part of the description. The gate slab 32 is a generally cuboid, flat solid body having two flat faces 33a, 33b (see FIG. 12) and two longer edges along the length and two shorter edges 33c,33d at its ends. As described above, the gate slab 32 comprises a generally round fluid aperture 32a extending through the thickness of the slab body from one flat face 33a to the other flat face 33b, to provide a fluid passage that is registrable with the central passage 52 (see FIG. 3) of a valve seat 42,44. At one shorter edge end 33c, that is distal to the stem shaft 30a when assembled, the gate slab 32 comprises a generally solid portion 32b. At the opposite shorter edge end 33d, that is closer to the stem shaft 30a when assembled, the gate slab 32 comprises a recessed plateau portion 33e at one side of the flat face (in FIG. 12, on flat face 33b). Within the region of the recessed plateau portion 33e, the gate slab 32 comprises a pin hole 32c extending through the thickness of the recessed plateau portion 33e to the flat face 33a. The recessed plateau portion 33e is dimensioned in thickness to fit inside a re-entrant recess 39a or 39b (see FIG. 11), the pin hole 32c located to register with the pin hole passage 38 of the slab holder 40 (see FIGS. 7 and 8). When assembled such that the pin hole passage 38 is aligned with the pin holes 32c of the gate slabs, the shear pin 36 can be inserted as a connector component to hold the gate slabs 32,34 on the slab holder 40.

Figure 12:
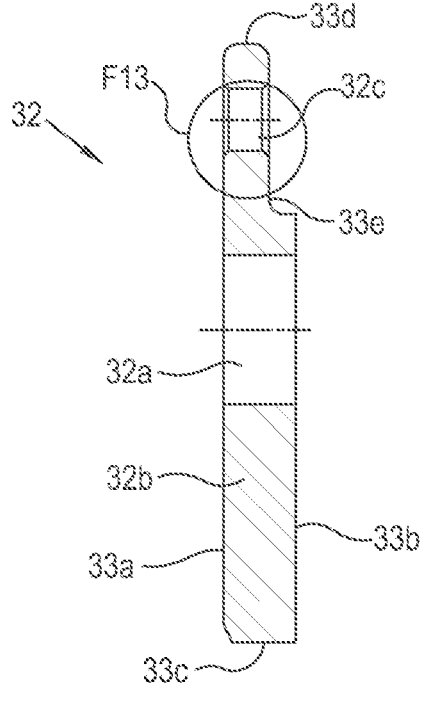
FIG. 12 is a section of a valve gate slab.
Figure 13:
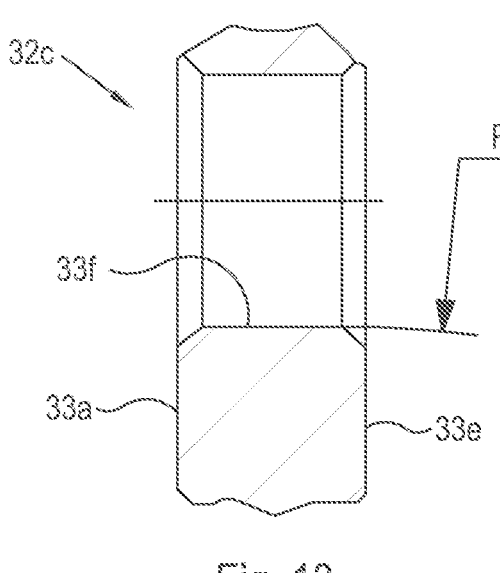
FIG. 13 is an enlarged view of area F13 of FIG. 12.

The pin holes 32c of the gate slabs 32,24 are wider than the shear pin 36, and have a height that closely matches that of the shear pin 36, and have a domed or part-cylindrical rim contour, with a curvature defined by a curved radius R at an inner rim 33f of the pin hole 32c between the flat face 33a and the recessed plateau portion 33e, as shown in FIG. 13 which is an enlarged view of detail F13 in FIG. 12. The arrangement achieves that there is practically no leeway, or slack, for a gate slab 32,34 to move in the axial direction, away from or towards, the stem shaft 30a. By way of the greater width relative to the shear pin 36, a gate slab 32 is not restricted from teetering relative to the stem shaft 30a while mounted on the shear pin 36. By way of the curved radius R of the pin hole inner rim 33f, a gate slab is able to rock, or tilt, relative to the stem shaft 30a.

Thereby, each gate slab 32,34 has several degrees of freedom permitting transverse movement along the axis of the shear pin 36, and permitting angular tilting and teetering perpendicularly to the shear pin axis, but is restricted in the axial direction of the stem shaft 30a. It will be appreciated that this allows each gate slab 32,34, when mounted via the shear pin 36 to the slab holder 40, to teeter relative to a plane of the gate seat region 62 perpendicular to a valve seat axis. The curved portion 33f allows 'rocking' relative to the shear pin 36 to thereby teeter in the vertical direction (vertical=in the direction of the axis of the stem shaft 30a) relative to the valve seat. The greater width of the aperture 32c allows swivelling relative to the shear pin 36 to thereby swivel, or teeter, in the horizontal direction relative to the valve seat (horizontal=in the direction perpendicular to axis of the stem shaft 30a). Depending on the clearance of the recessed plateau portion 33e between the outer wall 41a and the intermediate wall 41b, the gate slab 32 may also be allowed to move transversely along the shear pin 36, towards and away from the gate seat region 62 of the valve seat. The arrangement provides the ability of the gate slab to move in three dimensions relative to the valve seat (valve seat region 62), while limiting the degree of freedom to move in the axial direction relative to the stem shaft 30a. It will be understood that the tolerances are still narrow and any movement is designed to occur within tightly controlled clearance parameters. However, for practical purposes, the connection of the gate slabs 32,34 to the slab holder 40 can be considered an articulated joint providing an articulated connection of one or more gate plates relative to the gate-carrying shaft.

When referring to high pressures, it should be borne in mind that fluid pressures experienced in the intended use scenarios can result in the valve components experiencing relatively large loads urging parts thereof into surface-to-surface contact engagement. Such surface-to-surface contact engagement can risk damage and require premature maintenance or replacement if loads are applied unevenly. The provision of an articulated joint, even within small tolerance ranges, is believed to reduce wear that might otherwise result from uneven abutment, by allowing the gate slab to tightly adjust to the valve seat. An articulated joint is also believed to improve a repeatedly consistent and reliable seating.

The restriction in the axial (stem shaft) direction ensures that push and pull forces are transmitted from the gate stem 30 onto the gate slabs 32,34 reliably when the assembly is operated under high pressures with minimum, and practically no dead movement region. Furthermore, by providing an anisotropic cross-section of the shear pin 36, such as the illustrated oval cross-section, the gate slabs 32,34 are hindered from swinging in the plate plane, which in split-gate embodiments could result in splaying, that may otherwise occur and cause interference with the valve chamber walls when axially translated under high pressures.

The described arrangement allows a slab gate assembly or a split gate assembly to be provided that allows each gate slab to individually adopt a tight seal against its respective valve seat 42, 44 (which may be fixed in the valve gate body 12), while avoiding the requirement for a slab frame or cage. Indeed, the solid slab portions 32b,34b can be considered free ends, which reduces the dimensions of gate valve assembly.

Figures 7, 8, 9:
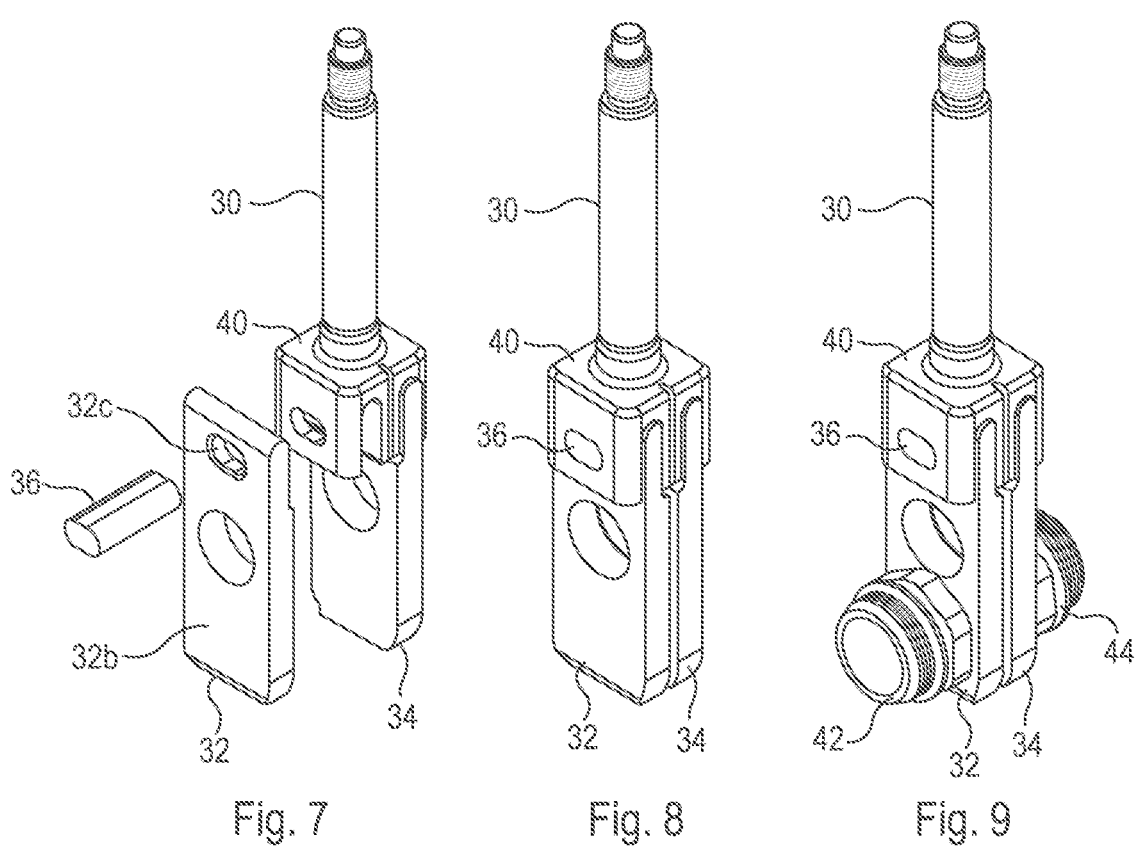
FIG. 7 is a part-exploded isometric view of a valve stem and gate components.
FIG. 8 is an assembled view corresponding to FIG. 7.
FIG. 9 is an isometric view of the FIG. 8 arrangement with valve seats.
Figures 10, 11:
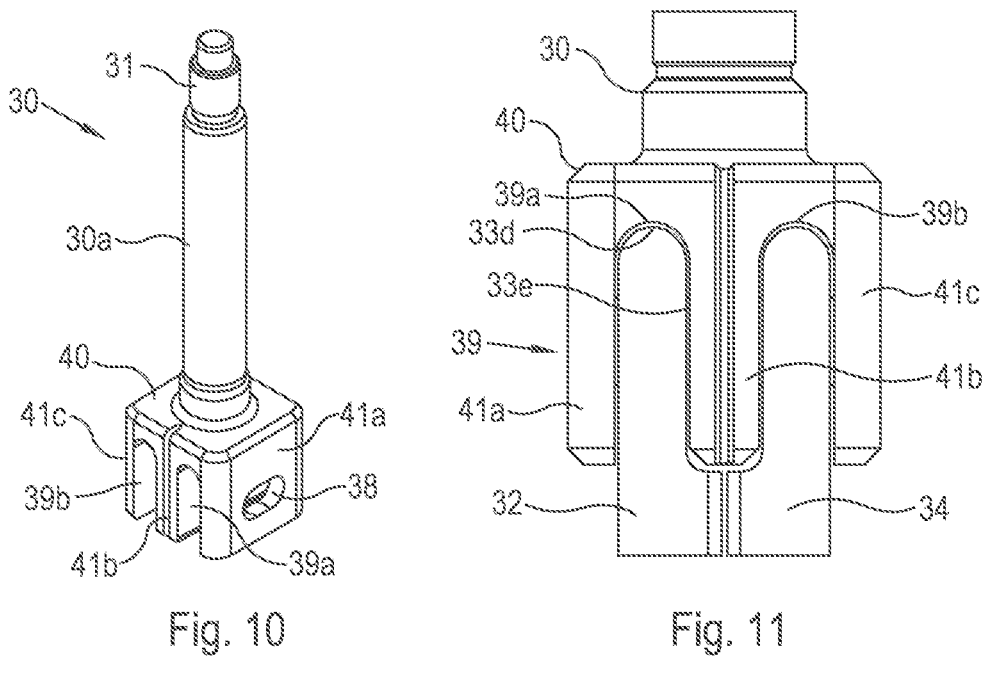
FIG. 10 is an isometric view of a valve stem.
FIG. 11 is a section view of a portion of a valve stem and gate components.

FIG. 9, which illustrates the gate slabs 32,34 relative to their respective valve seats 42,44, shows that each gate slab may individually adjust to the optimal position relative to its valve seat. The design provides each gate slab with a connection that allows articulation relative to the valve seat independently of the other gate slab. Still, only a single connector component (here, a single shear pin 36) is required to retain both gate slabs on the gate stem 30. Both gate slabs 32,34 can be controlled synchronously to move axially by the gate stem 30. It will also be appreciated that in the present form, the shear pin 36 is symmetrical, to facilitate manufacture. Likewise, the gate slabs 32,34 may be identically shaped components arranged in front-to-front configuration.

The development of an articulated gate slab connection, i.e. gate slabs that are fixed via an articulated connection to a slab holder 40 via one of their edges (here: a short edge 33d), while the opposite edge (here: the short edge 33c) is not mounted to the slab holder 40 of the gate carrying stem 30, has allowed the applicant to reduce the complexity of the valve gate body 12, because only a single port 17 is required to provide access for the gate components into the valve chamber 18. Conveniently, the port 17 is dimensioned to allow insertion of the valve seats, a torque-applying tool, and the slab gate assembly before being closed with a valve bonnet 14 over the gate stem 30. The port 17 may be dimensioned such that the valve seats 42,44 fit through the port 17 and can, thereby, be threadedly engaged in their respective seat pockets from within the valve gate body 12. It will be appreciated from inspection of FIG. 1 that the valve gate body 12 comprises a closed end 19, whereas, hitherto, such valve gate bodies were often of multi-part form to allow access into the valve gate body 12 for assembly and maintenance purposes. The compact design of the free-ended gate slabs allows a more compact, monolithic gate valve body to be used, which reduces the number of contact surfaces and assembly steps.

The present arrangements allow for a compact design, to fit into small installation envelopes. Furthermore, compared to known arrangements, the present gate valve design uses fewer gate components and a relatively small number of moving components, reducing the maintenance requirements, rendering the design particularly suitable for hard-to-reach areas such as subsea installations.

While the embodiments described in the Figures show a split gate valve design with two valve slabs, it will be appreciated that an articulated gate-carrying arrangement may carry a single gate slab. In that case, it may be preferable for the valve seats to have an adaptable design, configured to adapt to the position of the gate slab, for instance by way of a floating valve seat design, by way of a sprung/biased valve seat design, or other suitable valve seat designs.

By providing an articulated, tight contacting engagement of the gate slab against the valve seat, the gate slab is more likely to remain in practically permanent contact with the valve seat surface, whether it is open, shut, or moved between the open and shut position. A design to maintain metal-to-metal gate-on-seat contact reduces, and practically prevents, the likelihood of particles or debris to be entrapped at interface surfaces, and provides a wiping effect, thereby prolonging the practical service life. In this context, it should be borne in mind that the slab-to-seat contact and seal quality is intended to be maintained under high pressure subsea conditions, as a metal-to-metal surface contact without reliance on other seal materials. The articulated arrangement is believed to be particularly beneficial for split gate valves, and is believed to be of benefit for single slab gate valves in combination with adaptable (floating and/or sprung) valve seats.

It will be appreciated that the description hereinbefore is exemplary in accordance with embodiments of the invention, and that a wide range of modifications and alterations may be made thereto without departing from the scope of the invention as defined by the appended claims.

The invention claimed is:

1. A slab gate valve assembly comprising a housing providing an inlet, an outlet, and a gated fluid passage between the inlet and the outlet, at least one valve seat disposed in the housing, a gate-carrying shaft, and a slab gate plate arrangement in slidable engagement with the at least one valve seat and to be operated via the gate-carrying shaft between an open condition and a shut condition, wherein at least one plate of the gate plate arrangement comprises a fluid aperture to provide a passage between the inlet and the outlet when in registration with the fluid passage, and a solid slab portion to cover the valve seat in the shut condition, and is mounted at one plate end to the gate-carrying shaft, via at least one connector component oriented across an axis of the gate-carrying shaft, to form a connection arrangement providing a non-circular cross-section, to limit axial movement of the gate plate relative to the gate-carrying shaft more than perpendicular movement thereof, to reduce slack when translating axial movement of the gate-carrying shaft to an axial movement of the gate plate, while permitting gate plate articulation perpendicular to the gate-carrying shaft, and wherein the at least one plate comprises a free end not mounted to the gate-carrying shaft, whereby the gate plate articulation relative to the gate-carrying shaft and the free end allow the at least one plate to float into a sealing contact abutment against the valve seat when moved between the open and shut conditions.

2. The gate valve assembly according to claim 1, wherein the at least one gate plate is retained to the gate-carrying shaft via a connector component at the one plate end.

3. The gate valve assembly according to claim 2, wherein a single connector component retains at least two gate plates on the gate-carrying shaft.

4. The gate valve assembly according to claim 2, wherein the connector component is a pin oriented across an axis of the gate-carrying shaft.

5. The gate valve assembly according to claim 2, wherein the connector component comprises an anisotropic cross-section.

6. The gate valve assembly according to claim 4, wherein the connector component comprises a configuration permitting some rotational movement about the axis of the gate-carrying shaft.

7. The gate valve assembly according to claim 4, wherein at least one gate plate comprises an aperture comprising a curved rim contour.

8. The gate valve assembly according to claim 4, wherein the connector component comprises a configuration restricting axial movement of the gate plates relative to the axis of the gate-carrying shaft more than movement perpendicular to the axis of the gate-carrying shaft.

9. The gate valve assembly according to claim 1, comprising at least one valve seat threadedly disposed in a seat pocket of the housing.

10. The gate valve assembly according to claim 9, wherein at least one valve seat is threadedly engageable from within the housing.

11. The gate valve assembly according to claim 9, wherein the seat pocket comprises an abutment surface for a seating surface of the valve seat and a seal seat for a peripheral seal of the valve seat, configured such that the peripheral seal contacts the seal seat before the seating surface abuts against the abutment surface.

12. The gate valve assembly according to claim 9, wherein the housing comprises a port for the gate-carrying shaft, the valve seats being sized to fit through the port for assembly within the housing.

13. The gate valve assembly according to claim 9, wherein the valve seat comprises a crown configuration for engagement by a torque-applying tool.

14. The gate valve assembly according to claim 9, wherein the valve seat comprises a thread region comprising one of at least 10, at least 12, at least 14, at least 16, and at least 18 threads per inch.

15. The gate valve assembly according to claim 9, wherein the valve seat comprises a peripheral seal arranged at an oblique angle with reference to an axis of the valve seat.

16. The gate valve assembly according to claim 9, wherein the valve seat comprises an integral peripheral seal.

17. The gate valve assembly according to claim 11, wherein the valve seat comprises an integral peripheral seal angled in the direction of the seating surface.

18. The gate valve assembly according to claim 11, wherein the valve seat comprises a peripheral seal arranged at an oblique angle with reference to an axis of the valve seat and wherein the thread is located axially between the seating surface and the peripheral seal.

19. The gate valve assembly according to claim 1, wherein the gate plate arrangement is mounted to the gate-carrying shaft via a pin hole passage comprising one of an anisotropic circumference, an oval circumference and an oblong circumference.

20. The gate valve assembly according to claim 1, wherein the gate plate articulation relative to the gate-carrying shaft allows the at least one plate to float into a metal-to-metal contact abutment against the valve seat.

* * * * *